Oct. 29, 1963 H. G. LOTT ETAL 3,109,092
DIGITAL CURVE COMPUTER FOR USE IN CONTROLLING
THE PATH OF A WORK TOOL OR WORK PIECE
Filed Dec. 27, 1960 2 Sheets-Sheet 1

Inventors:
Heinz Günter Lott,
Elmar Götz, & Peter Boese
by: George U Spencer
Attorney

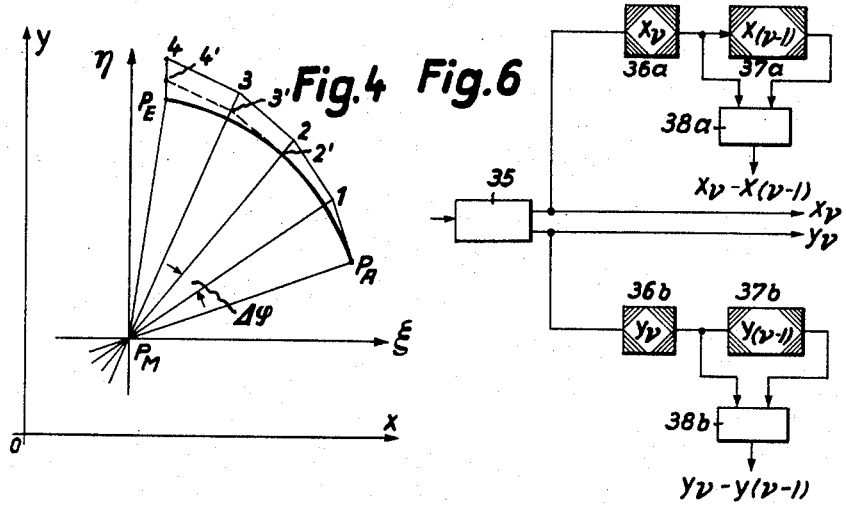
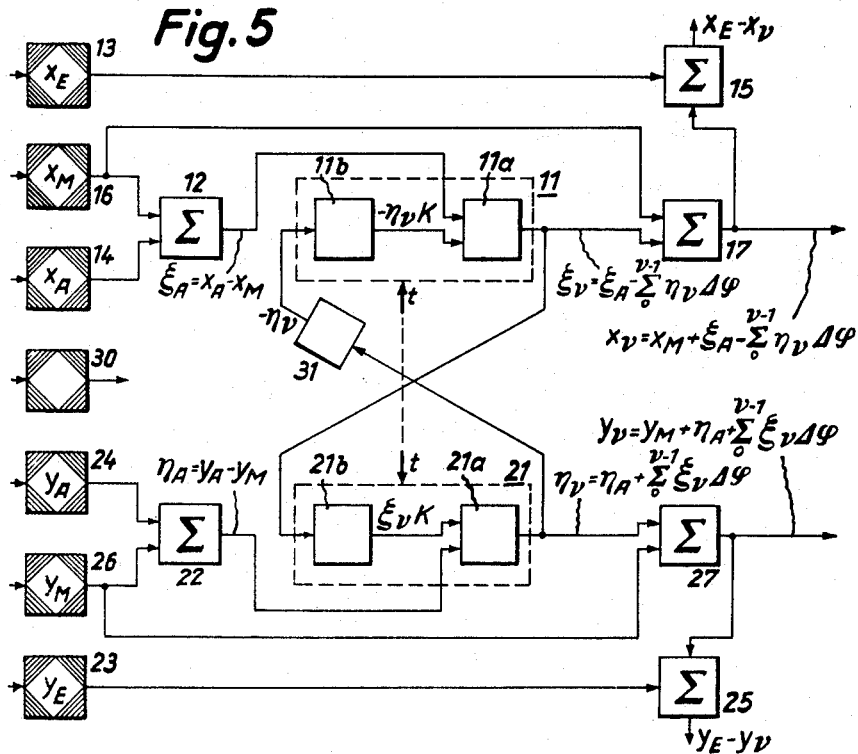

United States Patent Office 3,109,092
Patented Oct. 29, 1963

3,109,092
DIGITAL CURVE COMPUTER FOR USE IN CONTROLLING THE PATH OF A WORK TOOL OR WORK PIECE
Heinz Günter Lott, Berlin-Hermsdorf, and Elmar Götz and Peter Boese, Berlin-Frohnau, Germany, assignors to Licentia Patent-Verwaltungs-G.m.b.H., Frankfurt am Main, Germany
Filed Dec. 27, 1960, Ser. No. 78,574
Claims priority, application Germany Dec. 24, 1959
10 Claims. (Cl. 235—164)

The present invention relates to a computer.

More particularly, it is the primary object of the present invention to provide a digitally operating computer for continuously calculating the points along a curve composed of any desired number of rectilinear and/or circular arcuate portions. Such a computer may be used, for example, for controlling the path along which the tool of a machine tool moves with respect to a work piece, or the path along which the work piece is moved relative to the work tool.

Additional objects and advantages of the present invention will become apparent upon consideration of the following description when taken in conjunction with the accompanying drawings in which:

FIGURE 4 is a plot showing the operation of the computer when calculating the coordinates of points along a circular arcuate curve portion.

FIGURE 5 is a schematic diagram of the computer while carrying out the calculations illustrated graphically in FIGURE 4.

FIGURE 6 is a schematic diagram of an error-recognizing arrangement used in conjunction with the computer.

Figure 1:
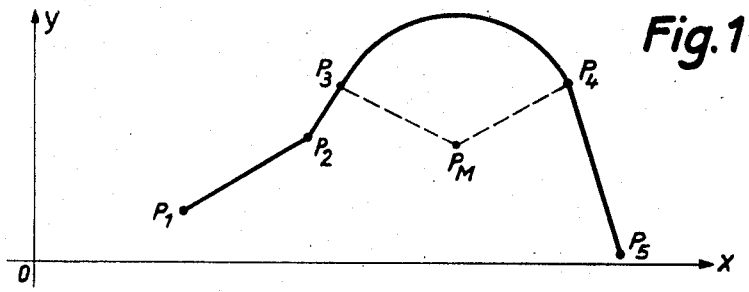
FIGURE 1 is a plot of a curve such as is to be calculated by a computer according to the present invention.

The computer according to the present invention gives the points along the curve in terms of $x$ and $y$ coordinates, these values being calculated on the basis of the characteristic curve data fed into the computer. The characteristic curve data includes the starting and end points of each rectilinear as well as circular arcuate curve portion, as well as the center of each arcuate portion. FIGURE 1 shows a curve consisting of three rectilinear portions and one arcuate portion, the characteristic data of this curve being the points $P_1$, $P_2$, $P_3$, $P_4$ and $P_5$ as well as the center $P_M$ of the arcuate portion $P_3$—$P_4$. The input values fed to the computer as well as the coordinate values of the points put out by the computer are in binary form. In order to determine the number of digits necessary to carry this out, the desired resolving power and the magnitude of the coordinate values which will appear must be known. The digital representation does not characterize a point but a square within which the point lies. The length of a side of this square represents the raster unit which corresponds to the desired resolving power.

In the computer according to the present invention, the outputs of the curve points of both coordinates are synchronized with each other and all digits of the indicated numbers are given simultaneously. The indication of each curve point is replaced by an indication of the next curve point after a time interval corresponding to the cadence or beat frequency interval of the computer, which can be adjusted, and the speed at which the curve is traversed is less at portions of greater curvature than at portions of lesser curvature.

The operation of the computer will depend on whether a rectilinear or a curvilinear portion is being treated.

When the computer calculates the points of a rectilinear portion, it operates exactly according to the following two equations:

$$x_\nu = x_A + \sum_1^\nu (x_E - x_A) K \qquad (1)$$

$$y_\nu = y_A + \sum_1^\nu (y_E - y_A) K \qquad (2)$$

Figure 2:
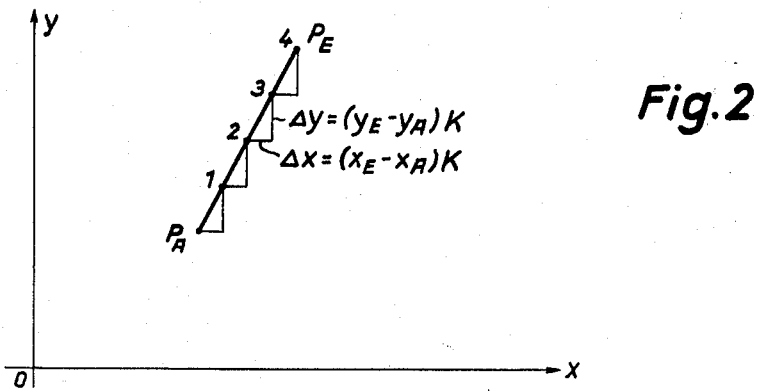
FIGURE 2 is a splot showing the operation of the computer when calculating the coordinates of points along a rectilinear curve portion.

The value K is a dimensionless constant peculiar to the computer, and always has the same value when rectilinear and curved portions are being computed. In the calculation of rectilinear portions, the value K represents mathematically the ratio of the distance between two adjacent curve points to the total length of the rectilinear portion between the starting point $P_A$ and the end point $P_E$, as shown in FIGURE 2. When a rectilinear portion is being calculated, the value $1/K$ represents the number of periods or cycles, i.e., the number of curve points being indicated at the output of the computer, which will be required to traverse the particular rectilinear portion involved.

FIGURE 2 shows a rectilinear curve portion which will be traversed in four periods. The value K should be at least so small that the length of the line which is traversed during one cycle will not, in $x$ or $y$ direction, be larger than one raster unit, because then the desired resolving power will no longer be reached. Inasmuch as the value K is a constant for the computer, it may be desirable to subdivide very long rectilinear portions into two sub-portions.

The computer operates according to the above Equations 1 and 2, in case of a rectilinear curve portion having a starting point $P_A$ and an end point $P_E$, such that the addition registers of two main computer components are supplied with the starting coordinates $x_A$ and $y_A$, and that the multipliers of the main computer components are provided with the differences $(x_A - x_E)$ and $(y_A - y_E)$ which are multiplied by the factor K and are stored. With each cycle $t$, the numbers stored in the multipliers are added to the numbers already present in the addition registers, while at the output of the computer there will appear the numbers accumulated in the addition registers, the lower digits being omitted.

Figure 3:
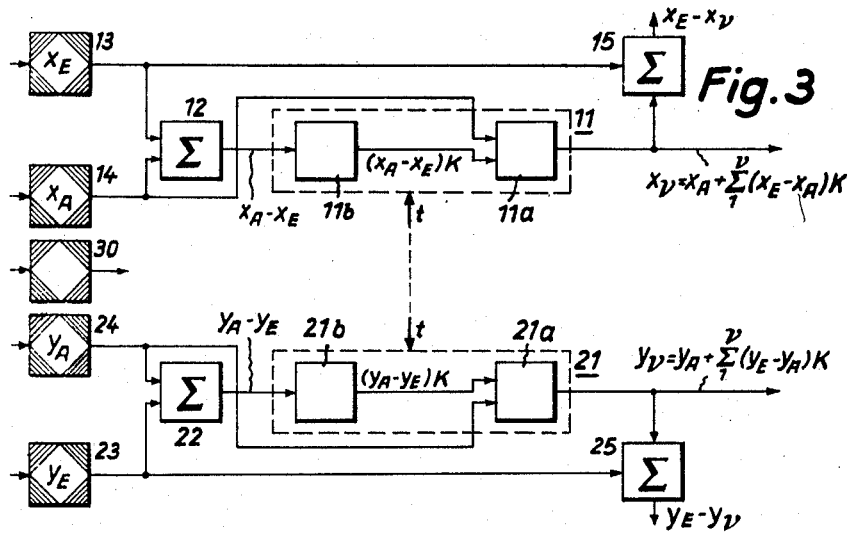
FIGURE 3 is a schematic diagram of a computer while carrying out the calculations illustrated graphically in FIGURE 2.

FIGURE 3 is a schematic diagram of one embodiment of a computer according to the present invention, the computer being connected so as to be able to calculate the coordinates of the points in a rectilinear curve portion. The circuit components which are not used in this phase of the operation of the computer are not shown. The computer is supplied with the characteristic data of the curve, this being done by means of any suitable storage device, such as punched tape, punched cards, magnetic tape, etc. In case the data contained in the storage device is not in the same number system as that with which the computer according to the present invention operates, a suitable converter must be interposed between the storage device and the computer.

At the left of FIGURE 3, there are shown the various items of information contained in the storage device. Part 30 contains the information as to whether a rectilinear or arcuate curve portion is involved; if a rectilinear portion is involved, the computer will assume the circuit connections shown in FIGURE 3. The parts 14 and 24 are inputs which represent the $x$ and $y$ coordinates, respectively, of the starting point of the rectilinear portion and parts 13 and 23 are inputs which represent the $x$ and $y$ coordinates, respectively, of the end points of this rectilinear portion. The coordinates $x_A$, $y_A$, of the starting point are fed to addition registers 11a, 21a of the main computer components 11 and 21. The difference values $(x_A-x_E)$ and $(y_A-y_E)$ are formed in the summation components 12 and 22, and the resulting values are fed to the multiplication components 11b and 21b of the main computing components 11 and 21. The values $(x_A-x_E)$ and $(y_A-y_E)$ are multiplied by K in the multiplication components 11b, 21b, and then stored. With each cycle t, the numbers stored in the multiplication components are added to the numbers already present in the addition registers 11a and 21a. The beat frequency of the cycles t is adjustable. Thus, after 1/K cycles, the numbers accumulated in the addition registers must coincide with the coordinate values of the end point.

The numbers stored in parts 13, 14, 23, 24 contain as many digits as are necessary to indicate a certain raster square in the x, y coordinate system. By multiplying the difference $(x_A-x_E)$ and $(y_A-y_E)$ by the factor K, which is very small as compared to the value 1, a number is obtained which surpasses the resolving power as fixed by the size of the raster unit. All of the digits of the values $(x_A-x_E)K$ and $(y_A-y_E)K$ are transmitted to the addition registers 11a and 21a. However, the numbers transferred from the addition registers to the outputs of the computer do not contain the lowest digits which surpass the resolving power as set by the size of the raster unit.

The difference between the output values of the computer and the coordinates of the end point of the rectilinear section appears in the summation components 15 and 25. The end point will have been reached as soon as these differences $(x_E-x_\nu)$ and $(y_E-y_\nu)$ become zero, and the input storage device will then present the data for the next curve portion. If this next curve portion is likewise a rectilinear one, the above-described operation will be repeated. The cadence or beat frequencies of both main computer components 11 and 21 are synchronized so that the values of both the x and y coordinates of the end point of a rectilinear curve portion will be reached at the same time. While one rectilinear portion is being calculated, the computer will have gone through 1/K beats or cycles. Thus, a new value will appear at the output of the computer 1/K times. This, however, does not mean that the x and y values at the output of the computer actually change 1/K times. If the x and/or y coordinates of the starting and end points are so close together that the numbers $(x_A-x_E)K$ and/or $(y_A-y_E)K$ are less than one raster unit, then a plurality of cycles will be necessary in order to advance the lowest digit of the registers 11a and/or 21a which is actually transmitted to the output of the computer.

When the computer calculates the points of a circular arcuate portion, i.e., a curve portion which is part of a circle, it operates according to approximately the following two equations:

$$x_\nu = x_M + \xi_A - \sum_0^{\nu-1} \eta_\nu K \quad (3)$$

$$y_\nu = y_M + \eta_A + \sum_0^{\nu-1} \xi_\nu K \quad (4)$$

$\xi_A$ and $\eta_A$ are the coordinates of the starting point $P_A$ represented in a coordinate system $\xi$, $\eta$, of which the center $P_M$ of the arcuate portion $P_A$—$P_E$ is the origin, as shown in FIGURE 4. The constant K has the same numerical value as when a rectilinear portion is being calculated, but here the constant represents mathematically the ratio of the distance between two points on the curve to the radius of the arcuate portion, i.e., K represents the angle $\Delta\varphi$ formed between two radii passing, respectively, through the two points. The number of cycles which must be gone through to traverse a given arcuate portion is now no longer equal to 1/K, as was the case with a rectilinear portion, but depends on the angle between the radii passing through the starting and end points of the arcuate portion. Thus, for a given arcuate length, the number of cycles necessary to travel along the portion varies inversely with the radius, i.e., the smaller the radius, the larger the number of periods which are required. Inasmuch as the beat frequency of the computer and thus the duration of each cycle is set to a certain constant value, an arcuate portion of a given linear length and having a strong curvature, i.e., a small radius, will be traversed more slowly than an arcuate portion of the same linear length but of less curvature, i.e., of larger radius.

FIGURE 4, which, for purposes of clarity, is drawn on an exaggerated scale, shows an arcuate portion as being traversed in four beats. It will be appreciated that in view of the fact that Equations 3 and 4 are not exact but represent limit conditions, the path which is followed is not truly circular but rather polygonal. The smaller the value K, the less will be the error between point $P_E$ and point 4.

The computer, operating pursuant to the Equations 3 and 4, calculates the points of a circular arc having a starting point $P_A$, and end point $P_E$, and a center $P_M$, as follows: the starting coordinates $\xi_A$ and $\eta_A$, which are given with reference to a coordinate system $\xi$, $\eta$, having the center $P_M$ at its origin, are fed to the addition registers of two main computing components; the negative of the output of the main computer component for the y coordinate is multiplied by the factor K in the multiplier of the main computer component for the x coordinate; the positive of the output of the main computer component for the x coordinate is multiplied by the factor K in the multiplier of the main computer component for the y coordinate; the numbers stored in the multipliers are added, at a beat t, to the numbers already present in the addition registers; and the numbers accumulated in the addition registers appear at the output of the computer, the lower digits being omitted and the coordinates $x_M$ and $y_M$ of the point $P_M$ being added.

FIGURE 5 is a schematic diagram of the computer showing the various components which are used during the calculation of points on an arcuate portion, some of these components having already been described in connection with FIGURE 3. As before, the storage device contains a number of individual parts which present the different items of information to the computer. As explained above, part 30 contains the information as to whether a rectilinear or arcuate curve portion is involved; if it is an arcuate one, the computer will assume the circuit connections as shown in FIGURE 5. Parts 14 and 24 contain the coordinates of the starting point, parts 13 and 23 the coordinates of the end point, and parts 16 and 26 contain the x and y coordinates, respectively, of the center point $P_M$. The difference values $(x_A-x_M)$ and $(y_A-y_M)$ are formed in the summation components 12 and 22. These differences are fed to the addition registers 11a and 21a of the main computing components 11 and 21. The output value $\eta_\nu$ of the main computing component 21 is multiplied by $(-1)$ in a multiplication component 31, and the output of component 31 is multiplied by k in the multiplier 11b of the main computer component 11. The positive of the output of the main computer component 11 is multiplied by K in the multiplier 21b of the main computer component 21. With each beat t, the numbers in the multipliers 11b and 21b are added to the numbers already stored in the addition registers 11a and 21a. The numbers $\xi_\nu$ and $\eta_\nu$ accumulated in the addition registers, without their lower digits which would surpass the resolving power as set by the size of the raster unit, are added to the coordinates $x_M$ and $y_M$ of the center point $P_M$ in summation components 17 and 27, the outputs of which are fed to the output of the computer.

As in the case of calculations involving rectilinear portions, the differences $(x_E-x_\nu)$ and $(y_E-y_\nu)$ are formed by the summation components 15 and 25. However, due to the error which arises, as shown in FIGURE 4, these two difference values will not reach zero at the same time. Thus, only one difference value can be used to control the termination of the run. The difference value which will be utilized will be the one which, for the end point that was reached, such as point 4 in FIGURE 4, has the lesser error in the inaccurate coordinate. This depends on the slope of the tangent through the end point and is determined when the data for the particular curve is given.

In the circuit shown in FIGURE 5, the summation components 17 and 27 may be omitted and their function taken over by the summation components 12 and 22. This is possible because the components 12 and 22 will never be called upon to operate at the same instant as the components 17 and 27.

The computer according to the present invention is preferably operated in the natural binary number system. This system is best suited, insofar as elaborateness of equipment as well as the switching function necessary for multiplication, addition, and subtraction are concerned. The number of digits will, of course, depend on the size of the coordinate values and on the resolving power desired.

There can be up to 40 digits, and more. In the natural binary number system, the computer will have a constant K of a value $\frac{1}{2}n$, wherein $n$ is as large a natural number as possible. As a result, when a number is multiplied by K, all that occurs will be a shifting of digits.

As stated above, the computer described herein can be used to calculate the points along rectilinear portions and arcuate portions which are part of a circle. Other paths, however, can readily be followed simply by using rectilinear and circular arcuate portions which approximate the actual curve to be followed.

The curve shown in FIGURE 1 lies in the first quadrant only. The computer according to the present invention, however, is not limited to curves in but one quadrant and will automatically operate accurately regardless of how many quadrants of the coordinate system are traversed.

When arcuate portions are being calculated, the computer is not absolutely exact. As stated above, an error will arise either in the $x$ or the $y$ coordinate; in FIGURE 4, this error represents the distance between the points $P_E$ and 4. This error, however, is eliminated before the next curve portion is traversed, because the addition registers 11a and 21a are given, at the start of the next run, the actual starting point of the new curve portion, be it rectilinear or arcuate. Thus, the incorrect coordinate position being indicated at the output of the computer will jump to the correct new starting point. If it is anticipated that the difference between the desired and actual end points will be too great, the arcuate portion can be subdivided into two portions. Thus, referring once again to FIGURE 4, the points 1, 2, 3, 4 would no longer be used; instead, the curve would be subdivided into portions $P_A$, 1, 2 and 2', 3', 4'. Here the discrepancy between 2 and 2' as well as the discrepancy between 4' and $P_E$ will each be less than the discrepancy between 4 and $P_E$.

It is also conceivable that the computer is to indicate but a single point in the coordinate system. Accordingly, the storage part 30 can contain such a signal that the computer will be caused to operate in such a manner as to transmit the desired points stored in parts 14 and 24, via the addition registers 11a and 21a, to the output of the computer.

The computer, as described so far, can be used for numerically controlling machine tools. In such machine tools the path calculated by the computer represents the movement of a machine tool relative to a work piece, or vice versa. Thus, errors, particularly larger errors, may cause expensive damage, not only to the work piece but possibly to the work tool and the machine tool itself, so that means should be provided which, in case of serious malfunction of the computer, are able to deactivate the computer or the machine tool itself. According to another feature of the present invention, therefore, two serially connected storage devices are connected to the outputs for each of the two coordinates. These storage devices store the numbers being fed to their inputs, at the same cadence or beat frequency as that at which the computer operates, but the beat of the second storage device is advanced with respect to the beat of the first storage device, so that a subtracter, which is connected to the outputs of the two storage devices, calculates the difference between two successive values being indicated by the computer. If this difference exceeds a certain predetermined amount, the computer and/or the machine tool will be stopped. Here it is assumed that the curve being calculated is uniform, which will indeed be the case where a machine tool control device is involved.

Such an arrangement is shown in FIGURE 6 in which the digital computer is indicated schematically at 35. The outputs for the coordinates $x_\nu$ and $y_\nu$ have two storage devices 36a, 37a and 36b, 37b serially connected thereto. The outputs of the storage devices 36a and 37a are connected to a subtracter 38a, and the outputs of the storage devices 36b and 37b are connected to a subtracter 38b. The storage devices 36a, 37a, 36b, 37b store the information arriving at their inputs at the same beat frequency as that at which the computer 35 operates. The beats of the storage devices 37a and 37b, however, are advanced with respect to the beats of the storage devices 36a and 36b. Preferably, the beats of the storage devices 37a and 37b are so timed as to coincide with the beats of the computer 35.

At the output of the computer 35, the values $X_{(\nu-1)}$ and $Y_{(\nu-1)}$ are replaced by the values $X_\nu$ and $X_\nu$, this taking place in synchronism with the beat of the computer 35. At the same instant, the values $X_{(\nu-1)}$ and $Y_{(\nu-1)}$ present in the storage devices 36a and 36b and acting on the storage devices 37a and 37b are picked up by these last-mentioned storage devices. As soon as this pickup is completed, the delayed beat of the storage devices 36a and 36b causes the values $X_\nu$ and $Y_\nu$ to be stored in these storage devices. The difference values $X_\nu-X_{(\nu-1)}$ and $Y_\nu-Y_{(\nu-1)}$ will then be formed in the subtracters 38a and 38b, respectively. Inasmuch as it was assumed that the computer will calculate only uniform curves, the difference between two adjacent coordinate values can normally never be above a certain maximum amount. This maximum amount depends on the greatest distance between two sets of curve data supplied to the computer, and can be determined for each curve to be calculated. The difference values $X_\nu-X_{(\nu-1)}$ or $Y_\nu-Y_{(\nu-1)}$, which can be positive or negative, are compared with the corresponding maximum amount. If this maximum amount is exceeded, the computer is deactivated, or other means for switching off the machine tool are brought into play.

It will be noted that the above-described arrangement will not be able to recognize small computing errors, but, as stated above, it is especially important that large errors be recognized as quickly as possible.

The error-recognizing arrangement described above is not limited to a digital computer according to FIGURES 3 and 5, but can be used when the computer, instead of calculating the absolute values of coordinates, calculates incremental values. The error-recognizing arrangement is also usable if the computer does not give all of the digits of its output simultaneously but consecutively, although the arrangement is particularly well suited for computers which operate in the binary number system, because then the construction of the entire arrangement will be relatively simple.

It will be understood that the above description of the present invention is susceptible to various modifications, changes and adaptations, and the same are intended to be comprehended within the meaning and range of equivalents of the appended claims.

We claim:

1. A digital computer for computing the coordinates of a rectilinear curve portion having a starting point $P_A$ whose coordinates are $x_A$ and $y_A$ and an end point $P_E$ whose coordinates are $x_E$ and $y_E$, comprising, in combination: an $x$ coordinate main computer compenent and a $y$ coordinate main computer component, each computer component having an addition register and a multiplier; means for supplying the values $x_A$ and $y_A$ to the addition registers of the respective main computer components; means for supplying the values $(x_A-x_E)$ and $(y_A-y_E)$ to the multipliers of the respective main computer components and multiplying them therein by a factor K; means for periodically feeding the thus-obtained values $(x_A-x_E)K$ and $(y_A-y_E)K$ to the addition registers of the respective main computer components and there adding them to the values $x_A$ and $y_A$ stored therein; and means for supplying the output of said addition registers to the output of the digital computer.

2. A digital computer as defined in claim 1 wherein said factor K is a constant that is sufficiently small to obtain the desired resolving power and wherein only those digits of the output of said addition registers which are above the resolving power are supplied to said output of the digital computer.

3. A digital computer for computing the coordinates of a circular arcuate curve portion having a center point $P_M$ whose coordinate are $x_M$ and $y_M$, a starting point $P_A$ whose coordinates, in a coordinate system $\xi$, $\eta$, having said point $P_M$ at its origin, are $\xi_A$ and $\eta_A$, and an end point $P_E$, comprising, in combination: an $x$ coordinate main computer component and a $y$ coordinate main computer component, each computer component having an addition register and a multiplier; means for supplying the value $\xi_A$ to the addition register of said $x$ coordinate main computer component and the value $\eta_A$ to the addition register of said $y$ coordinate main computer component; means for supplying the negative of the output of said $y$ coordinate main computer component to the multiplier of said $x$ coordinate main computer component and multiplying the same by a factor K; means for supplying the positive of the output of said $x$ coordinate main computer component to the multiplier of said $y$ coordinate main computer component and multiplying the same by said factor K; means for periodically feeding the contents of said multipliers to the corresponding addition registers; and means for supplying to the output of the digital computer values equal to the output of said addition registers plus the coordinates $x_M$ and $y_M$.

4. A digital computer as defined in claim 3 wherein said factor K is a constant that is sufficiently small to obtain the desired resolving power and wherein only those digits of the output of said addition registers which are above the resolving power are supplied to said output of the digital computer.

5. A digital computer for computing the coordinates of a rectilinear curve portion having a starting point $P_A$ whose coordinates are $x_A$ and $y_A$ and an end point $P_E$ whose coordinates are $x_E$ and $y_E$ as well as for computing the coordinates of a circular arcuate curve portion having a center point $P_M$ whose coordinates are $x_M$ and $y_M$, a starting point $P_A'$ whose coordinates, in a coordinate system $\xi$, $\eta$, having said point $P_M$ at its origin, are $\xi_A$ and $\eta_A$, and an end point $P_E'$, comprising, in combination: an $x$ coordinate main computer component and a $y$ coordinate main computer component, each computer component having an addition register and a multiplier; means effective during the computation of the coordinates of a rectilinear curve portion for supplying the values $x_A$ and $y_A$ to the addition registers of the respective main computer components; means likewise effective during the computation of the coordinates of a rectilinear curve portion for supplying the values $(x_A-x_E)$ and $(y_A-y_E)$ to the multipliers of the respective main computer component and multiplying them therein by a factor K; means likewise effective during the computation of the coordinates of a rectilinear curve portion for periodically feeding the thus-obtained values $(x_A-x_E)K$ and $(y_A-y_E)K$ to the addition registers of the respective main computer components and there adding them to the values $x_A$ and $y_A$ stored therein; means likewise effective during the computation of the coordinates of a rectilinear curve portion for supplying to the output of the digital computer the output of said addition registers; means effective during the computation of the coordinates of a circular arcuate curve portion for supplying the value $\xi_A$ to the addition register of said $x$ coordinate main computer component and the value $\eta_A$ to the addition register of said $y$ coordinate main computer component; means likewise effective during the computation of the coordinates of a circular arcuate curve portion for supplying the negative of the output of said $y$ coordinate main computer component to the multiplier of said $x$ coordinate main computer component and multiplying the same by said factor K; means likewise effective during the computation of the coordinates of a circular arcuate curve portion for supplying the positive of the output of said $x$ coordinate main computer component to the multiplier of said $y$ coordinate main computer component and multiplying the same by said factor K; means likewise effective during the computation of the coordinates of a circular arcuate curve portion for periodically feeding the contents of said multipliers to the corresponding addition registers, and means likewise effective during the computation of the coordinates of a circular arcuate curve portion for supplying to the output of the digital computer values equal to the output of said addition registers plus the coordinates $x_M$ and $y_M$.

6. A digital computer as defined in claim 5 wherein said factor K is a constant that is sufficiently small to obtain the desired resolving power and wherein only those digits of the output of said addition registers which are above the resolving power are supplied to said output of the digital computer.

7. A digital computer as defined in claim 5 and utilizing the natural binary number system.

8. A digital computer as defined in claim 5, further comprising summation means; means for supplying to said summation means the output of the digital computer and the coordinates of the end point of the curve portion whose points are being calculated; and means for supplying to the digital computer the data of the next curve portion when the difference between the output of the digital computer and the coordinates of the end point of the curve portion last treated equals zero.

9. A digital computer as defined in claim 5, further comprising two serially connected storage devices connected to the output of each main computer component; means for simultaneously storing in said storage devices two consecutive outputs of each main computer component; means for determining the difference between said two consecutive outputs; and means for deactivating the digital computer when said last-mentioned difference exceeds a predetermined amount.

10. A digital computer as defined in claim 9 wherein the further one of the two serially connected storage devices is synchronized with the beat of the digital computer.

(References on following page)

References Cited in the file of this patent

UNITED STATES PATENTS

| | | |
|---|---|---|
| 2,428,811 | Rajchman | Oct. 14, 1947 |
| 2,435,841 | Morton et al. | Feb. 10, 1948 |
| 2,609,143 | Stibitz | Sept. 2, 1952 |
| 2,675,962 | Couffignal | Apr. 20, 1954 |
| 2,841,328 | Steele et al. | July 1, 1958 |
| 2,861,744 | Schmitt et al. | Nov. 25, 1958 |
| 2,866,506 | Hierath et al. | Dec. 30, 1956 |
| 2,922,940 | Mergler | Jan. 26, 1960 |
| 2,960,266 | Loshing et al. | Nov. 15, 1960 |